US012724921B2

(12) United States Patent
Belejevas et al.

(10) Patent No.: US 12,724,921 B2
(45) Date of Patent: Sep. 1, 2026

(54) SYSTEMS AND METHODS FOR INSTRUCTING DATA BROKERS TO REMOVE PERSONAL DATA

(71) Applicant: UAB 360 IT, Vilnius (LT)

(72) Inventors: Darius Belejevas, Vilnius (LT); Arnas Rudižiūnas, Vilnius (LT)

(73) Assignee: Netflow, UAB, Vilnius (LT)

( * ) Notice: Subject to any disclaimer, the term of this patent is extended or adjusted under 35 U.S.C. 154(b) by 268 days.

(21) Appl. No.: 18/322,991

(22) Filed: May 24, 2023

(65) Prior Publication Data

US 2024/0394406 A1 Nov. 28, 2024

(51) Int. Cl.
*G06F 16/9535* (2019.01)
*G06F 21/62* (2013.01)

(52) U.S. Cl.
CPC ...... *G06F 21/6254* (2013.01); *G06F 16/9535* (2019.01); *G06F 21/6245* (2013.01); *G06F 21/6263* (2013.01)

(58) Field of Classification Search
CPC ............. G06F 21/6254; G06F 16/9535; G06F 21/6245; G06F 21/6263
See application file for complete search history.

(56) References Cited

U.S. PATENT DOCUMENTS 10,169,315 B1 * 1/2019 Heckel .................... G06F 21/60
10,691,763 B2 6/2020 Castelli
12,147,564 B1 * 11/2024 Ma ........................ G06F 16/162
2009/0319523 A1 * 12/2009 Anderson ......... G06F 16/24575 709/219
2020/0302087 A1 9/2020 Parkinson
2021/0124800 A1 * 4/2021 Williams .............. G06F 40/295
2021/0383370 A1 * 12/2021 Tippets ................ G06Q 20/383
2022/0164332 A1 * 5/2022 Hoang ................ G06F 16/2456
2023/0360156 A1 * 11/2023 Paracha ................. G06Q 50/18
2024/0370670 A1 * 11/2024 Gambhir ............... G06F 40/103

OTHER PUBLICATIONS

Office Action Dated Feb. 6, 2025 in U.S. Appl. No. 18/323,512.

* cited by examiner

*Primary Examiner* — Andrew Suh
(74) *Attorney, Agent, or Firm* — Meunier Carlin & Curfman LLC

(57) ABSTRACT

A service that allows user to request personal data be removed from multiple data brokers or people search providers and tracks the requests is provided. A user provides identifying data that can be used to verify their identify to the service. The identifying data may include information such as name, current and/or previous addresses, email address, telephone number, sex, birthdate, etc. With respect to data brokers, the service retrieves information retrieves requirements for each of a plurality of data brokers. Based on the identifying data and the requirements, the service sends an instruction to the data broker to delete the private data. As responses are received from the data brokers, the service updates a report where the user can view information about each data broker and whether or not each data broker has deleted the user's private data.

14 Claims, 7 Drawing Sheets

700

SYSTEMS AND METHODS FOR INSTRUCTING DATA BROKERS TO REMOVE PERSONAL DATA

BACKGROUND

Users are increasingly concerned with the collection and selling of what they consider to be personal data to third-parties. Personal data may include a variety of information about a user such as their address, phone numbers, browsing history, marital status, purchase history, and criminal record, for example. Governments have responded to these concerns by passing laws such as California Consumer Privacy Act (CCPA) and the General Data Protection Regulation (GDPR).

However, a major drawback associated with these laws is that they require the user to identify third-parties that have their private data, and to submit a request to each third-party to delete their private data. This is particularly problematic because users may not know all of the third-parties who have personal data related to the user, and even if they did, given the large number of such third-party providers is difficult and time consuming given that each third-party may have different procedures or processes that are used to request the removal of private data.

SUMMARY

A service that allows a user to request personal data be removed from multiple data brokers or people search providers databases and tracks the requests is provided. A user provides identifying data that can be used to verify their identify to the service. The identifying data may include information such as name, current and/or previous addresses, email address, telephone number, sex, birthdate, current and/or previous education, current and/or previous work experience, social media presence, etc. With respect to data brokers, the service retrieves information retrieves requirements for each of a plurality of data brokers. The requirements for a data broker may describe the identifying data required by the data broker to determine whether it has private data of a user as well as the procedure used by the data broker to request deletion of the private data. Based on the identifying data provided by the user, and the requirements of each data broker, the service provides a subset of the identifying data to each data broker to determine whether the data broker has private data of the user. For each data broker that has private data of the user, the service sends an instruction to the data broker to delete the private data. As responses are received from the data brokers, the service updates a report where the user can view information about each data broker and whether or not each data broker has deleted the user's private data.

With respect to people search providers, these providers typically are associated with databases where people can search for individuals by providing personal information such as name and/or address. However, each people search provider enables different access to the databases, including particular fields and forms on the provider's web application (e.g., website), APIs, and/or on a provider's client application that are used to submit queries. Accordingly, the service may maintain form field data about the various forms and fields used on the web application (e.g., website), and/or on the client application associated with each provider.

For each people search provider, the service may formulate a query using the identifying data provided by the user and may submit it to the web application (e.g., website) of the search provider based on the accesses to databases (e.g., form field data using a web browser). In response, the service may receive from each people search provider a list of individuals who may match the user. The service may then use the identifying data to determine which individuals are likely the same as the user. Once the matching individuals are determined, the service can generate instructions for each people search provider to remove the personal data about each matching individual. The instructions may be provided via accesses to databases (e.g., forms associated with each website).

In an embodiment, a method for removing personal data from one or more data brokers is provided. The method includes: receiving, by a computing device, a request to remove personal data for a user; collecting, by the computing device, a set of identifying data from the user in response to the request to remove the personal data; selecting, by the computing device, one or more data brokers from a plurality of data brokers; sending, by the computing device, an instruction to remove the personal data to each of the selected one or more data brokers, wherein each instruction sent to a data broker includes some or all of the set of identifying data; receiving, by the computing device, a response to the instruction from at least one data broker; automatically determining, by the computing device, that the response indicates that the personal data was removed by the at least one data broker using a machine learning model; and notifying, by the computing device, the user that the response indicates that the personal data was removed by the at least one data broker.

Implementations may include some or all of the following features. The method may further include: determining requirements for each of the selected one or more data brokers; and determining a subset of the set of identifying data for each data broker based on the determined requirements, wherein each instruction sent to a data broker includes the determined subset of the set of identifying data for the data broker. The method may further include: receiving a set of training data, wherein the training data comprises a plurality of responses received from some or all of the plurality of data brokers, wherein each of the plurality of responses is labeled as either indicating that personal data was removed or that personal data was not removed; and training the machine learning model using the set of training data. The method may further include: automatically determining that the response indicates that the personal data was not removed by the at least one data broker using the machine learning model; and notifying the user that that the response indicates that the personal data was not removed by the at least one data broker. The method may further include: determining that a threshold amount of time has passed since the instruction was sent to the at least one data broker; and resending the instruction to the at least one data broker in response to determining that the threshold amount of time has passed. The method may further include: determining whether the at least one data broker does not maintain a suppression list; and resending the instruction only if the at least one data broker does not maintain the suppression list. The method may further include: determining a location associated with the user; and selecting the one or more data brokers based on the determined location. The method may further include: determining data brokers of the plurality of data brokers that have the personal data of the user using some or all of the set of identifying data and requirements associated with each data broker of the plurality of data brokers; and selecting the one or more data brokers based on the data brokers determined to have the personal data. The set of identifying information may include one of a name, age, address, address, email address, or phone number.

In an embodiment, a system for removing personal data from one or more data brokers is provided. The system includes at least one computing device; and a computer-readable medium with computer-executable instructions that when executed by the at least one computing device cause the at least one computing device to: receive a request to remove personal data for a user; collect a set of identifying data from the user in response to the request to remove the personal data; select one or more data brokers from a plurality of data brokers; send an instruction to remove the personal data to each of the selected one or more data brokers, wherein each instruction sent to a data broker includes some or all of the set of identifying data; receive a response to the instruction from at least one data broker; automatically determine that the response indicates that the personal data was removed by the at least one data broker using a machine learning model; and notify the user that the response indicates that the personal data was removed by the at least one data broker.

Embodiments may further include some or all of the following features. The system may include computer-executable instructions that when executed by the at least one computing device cause the at least one computing device to: determine requirements for each of the selected one or more data brokers; and determine a subset of the set of identifying data for each data broker based on the determined requirements, wherein each instruction sent to a data broker includes the determined subset of the set of identifying data for the data broker. The system may include computer-executable instructions that when executed by the at least one computing device cause the at least one computing device to: receive a set of training data, wherein the training data comprises a plurality of responses received from some or all of the plurality of data brokers, wherein each of the plurality of responses is labeled as either indicating that personal data was removed or that personal data was not removed; and train the machine learning model using the set of training data. The system may include computer-executable instructions that when executed by the at least one computing device cause the at least one computing device to: automatically determine that the response indicates that the personal data was not removed by the at least one data broker using the machine learning model; and notify the user that that the response indicates that the personal data was not removed by the at least one data broker. The system may include computer-executable instructions that when executed by the at least one computing device cause the at least one computing device to: determine that a threshold amount of time has passed since the instruction was sent to the at least one data broker; and resend the instruction to the at least one data broker in response to determining that the threshold amount of time has passed. The system may include computer-executable instructions that when executed by the at least one computing device cause the at least one computing device to: determine whether the at least one data broker does not maintain a suppression list; and resend the instruction only if the at least one data broker does not maintain the suppression list.

In an embodiment, a non-transitory computer-readable medium is provided. The computer-readable medium with computer-executable instructions stored thereon that when executed by at least one computing device cause the at least one computing device to: receive a request to remove personal data for a user; collect a set of identifying data from the user in response to the request to remove the personal data; select one or more data brokers from a plurality of data brokers; send an instruction to remove the personal data to each of the selected one or more data brokers, wherein each instruction sent to a data broker includes some or all of the set of identifying data; receive a response to the instruction from at least one data broker; automatically determine that the response indicates that the personal data was removed by the at least one data broker using a machine learning model; and notify the user that the response indicates that the personal data was removed by the at least one data broker.

Implementations may include some or all of the following features. The computer-readable medium may further include computer-executable instructions that when executed by the at least one computing device cause the at least one computing device to: determine requirements for each of the selected one or more data brokers; and determine a subset of the set of identifying data for each data broker based on the determined requirements, wherein each instruction sent to a data broker includes the determined subset of the set of identifying data for the data broker. The computer-readable medium mat further include computer-executable instructions that when executed by the at least one computing device cause the at least one computing device to: receive a set of training data, wherein the training data comprises a plurality of responses received from some or all of the plurality of data brokers, wherein each of the plurality of responses is labeled as either indicating that personal data was removed or that personal data was not removed; and train the machine learning model using the set of training data. The computer-readable medium mat further include comprising computer-executable instructions that when executed by the at least one computing device cause the at least one computing device to: automatically determine that the response indicates that the personal data was not removed by the at least one data broker using the machine learning model; and notify the user that that the response indicates that the personal data was not removed by the at least one data broker. The computer-readable medium mat further include comprising computer-executable instructions that when executed by the at least one computing device cause the at least one computing device to: determine that a threshold amount of time has passed since the instruction was sent to the at least one data broker; and resend the instruction to the at least one data broker in response to determining that the threshold amount of time has passed.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated herein and form part of the specification, illustrate a malware detection system and method. Together with the description, the figures further serve to explain the principles of the personal data removal system and method described herein and thereby enable a person skilled in the pertinent art to make and use the personal data removal system and method.

DETAILED DESCRIPTION

Figure 1:
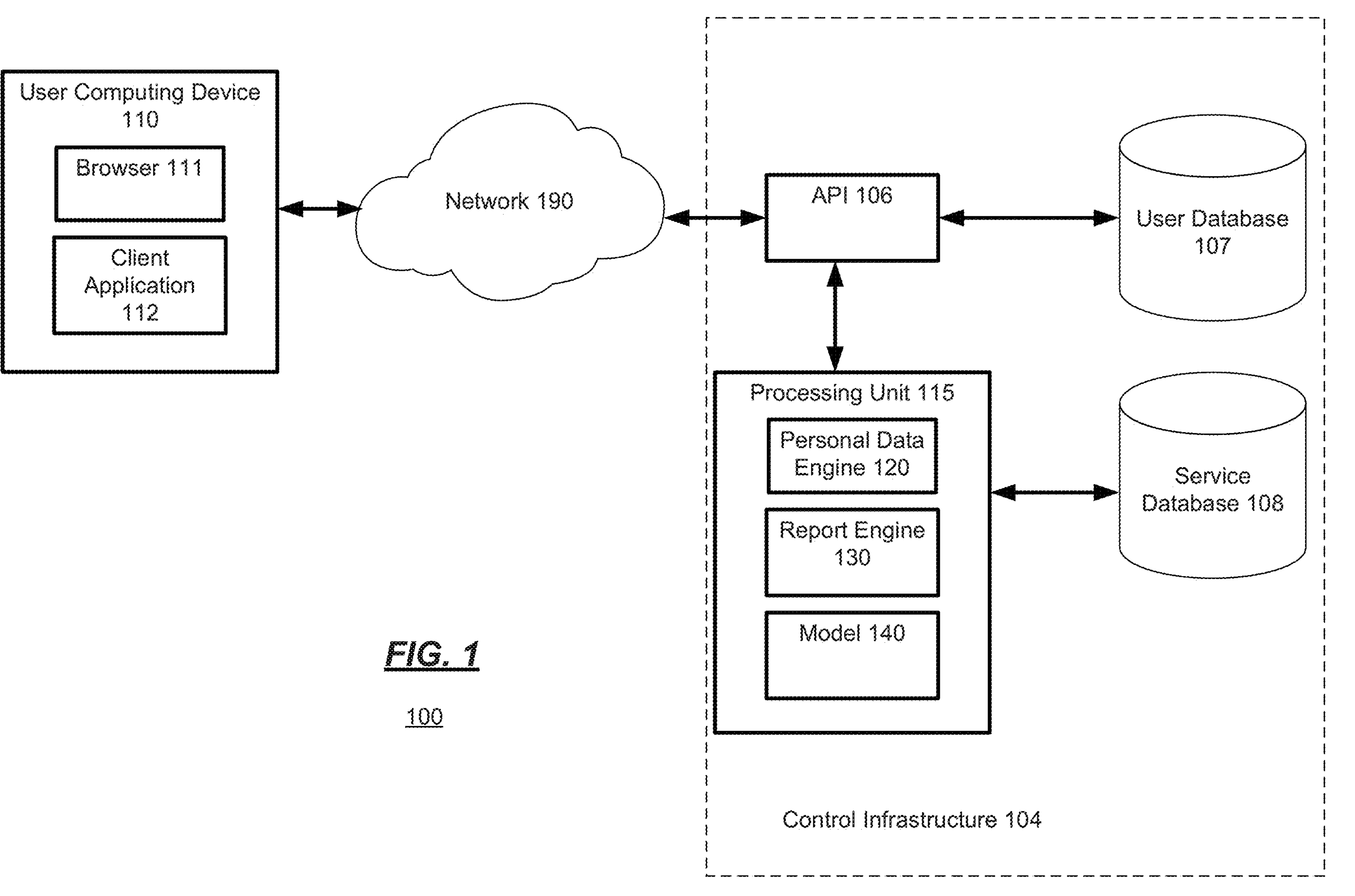
FIG. 1 is an example environment for removing personal data from one or more data brokers and people search provider databases.

FIG. 1 is an example environment 100 associated with removing personal data from one or more data broker and people search provider databases, according to various aspects of the present disclosure. As shown, the environment 100 includes a control infrastructure 104 capable to communicate with one or more user computing devices 110 through a network 190. The control infrastructure 104 may be controlled by the personal data removing service provider and may include application programming interface (API) 106, a user database 107, a service database 108, and the one or more processing units 115. As shown in FIG. 1, the API 106 may be capable of communicating with the user database 107, and the one or more processing units 115. Additionally, the one or more processing units 115 may be capable of communication with the service database 108. Each of the one or more processing units 115, the user computing devices 110, the people search providers 210, and the data brokers 205 may be implemented using one or more general purpose computing devices such as the computing device 700 illustrated with respect to FIG. 7. Moreover, in some embodiments, the one or more processing units 115 may be implemented in a cloud-based computing environment.

The user computing device 110 may be a physical computing device capable of hosting a browser application and (or) a client application, and of connecting to the network 190. The user computing device 110 may be, for example, a laptop, a mobile phone, a tablet computer, a desktop computer, a smart device, a router, or the like. In some aspects, the user computing device 110 may include, for example, Internet-of-Things (IoT) devices such as smart home appliances, smart home security systems, autonomous vehicles, smart health monitors, smart factory equipment, wireless inventory trackers, biometric cyber security scanners, or the like. The network 190 may be any digital telecommunication network that permits several user computing devices to access resources. In some aspects, the network 190 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The control infrastructure 104 may include a combination of hardware and software components that enable provision of personal data removing services to the user computing device 110. The control infrastructure 104 may interface with (the browser and (or) client application on) the user computing device 110 via the API 106, which may include one or more endpoints to a defined request-response message system. In some aspects, the API 106 may be configured to receive, via the network 190, a connection request from the user computing device 110 to remove personal data from one or more people search providers and/or data brokers. The connection request may include an authentication request to authenticate the user computing device 110 and/or a request to find and remove personal data from one or more people search providers and/or data brokers. The API 106 may receive the authentication request and the request to find and remove personal data from one or more people search providers and/or data brokers in a single connection request. In some aspects, the API 106 may receive the authentication request and the request to find and remove personal data from one or more people search providers and/or data brokers in a single connection request in separate connection requests.

The API 106 may further be configured to handle the connection request by mediating the authentication request. For instance, the API 106 may receive from the user computing device 110 credentials including, for example, a unique combination of a user ID and password for purposes of authenticating the user computing device 110. In another example, the credentials may include a unique validation code known to an authentic user. The API 106 may provide the received credentials to the user database 107 for verification.

The user database 107 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The personal data removing service provider may add, delete, and/or modify such valid unique combinations of user IDs and passwords from the structured repository. Based at least in part on receiving the credentials from the API 106, the user database 107 and a processor (e.g., the processing unit 115 or another local or remote processor) may verify the received credentials by matching the received credentials with the valid credentials stored in the structured repository. In some aspects, the user database 107 and the processor may authenticate the user computing device 110 when the received credentials match at least one of the valid credentials. In this case, the personal data removing service provider may enable the user computing device 110 to obtain personal data removing services. When the received credentials fail to match at least one of the valid credentials, the user database 107 and the processor may fail to authenticate the user computing device 110. In this case, the personal data removing service provider may decline to provide personal data removing services to the user computing device 110.

When the user computing device 110 is authenticated, the user computing device 110 may initiate the removal of their personal data and may transmit to the API 106 a request to find and remove personal data from one or more people search providers and/or data brokers. The processing unit 115 included in the control infrastructure 104 may be configured to determine/identify one or more personal data instances in the service database 108.

The processing unit 115 may include several components including, but not limited to, a personal data engine 120, a report engine 130, and a model 140. More or fewer components may be supported. In some cases, the control infrastructure 104 may contain multiple processing units 115 with a single component (e.g., a personal data engine 120). In other cases, control infrastructure 104 may contain multiple processing units with multiple components (e.g., a personal data engine 120, a report engine 130, and a model 140).

The personal data engine 120 may allow a user to request the removal of their personal data 225 from one or more people search providers and data brokers. Personal data 225 as used herein includes any information that relates to an identifiable person. Personal data 225 may, for example, include information on names, age, sex, date of birth, place of birth, citizenship, addresses or addresses history, e-mail addresses, social media account handles, telephone number, personal identification numbers, registration numbers, driver's license number, photos, biometrics (e.g., fingerprints), diagnostics, medical and criminal histories, and biological material. Other information may be included. The personal data engine 120 may communicate with the service database 108 to check for the stored information on the one or more people search providers and data brokers and to determine which of the one or more people search providers and data brokers should be contacted about the personal data 225 of the identifiable person.

Figure 7:
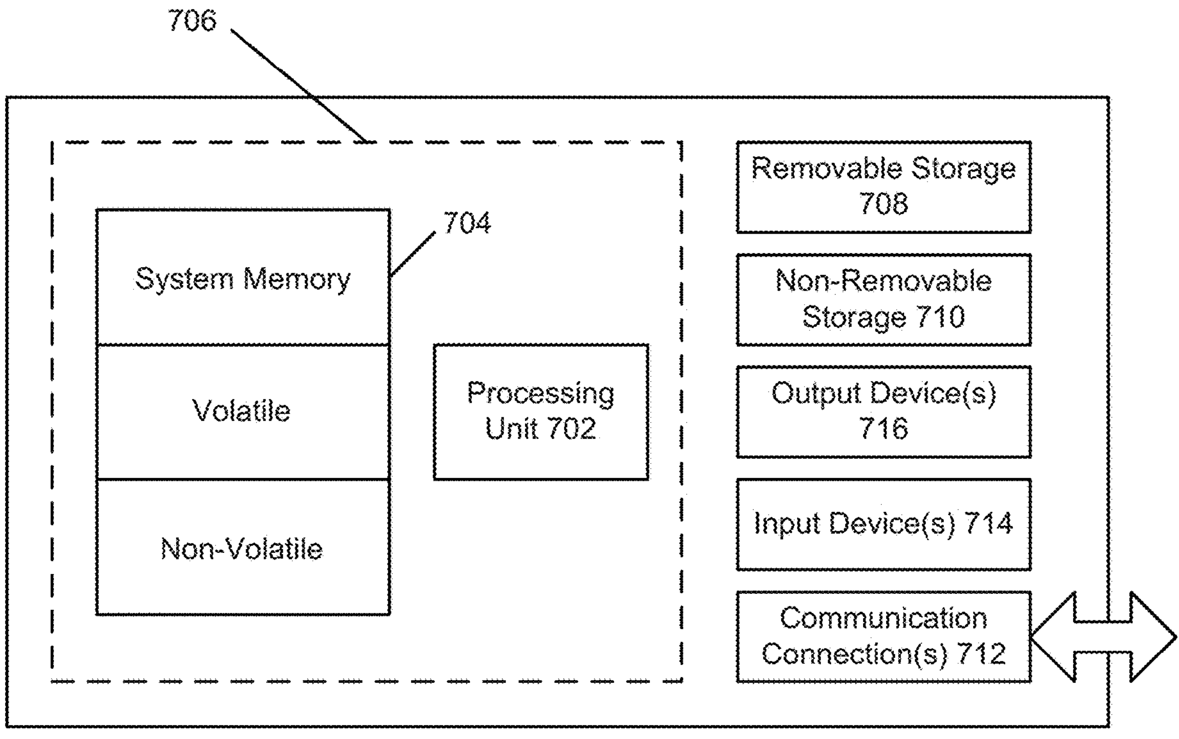
FIG. 7 shows an exemplary computing environment in which example embodiments and aspects may be implemented.

One or more components (e.g., API 106, user database 107, processing unit 115, and/or service database 108) included in the control infrastructure 104 and/or components (e.g., processing unit, memory, communication interface, etc.) included in the user computing device 110 and/or components (e.g., processing unit, memory, communication interface, etc.) may further be associated with a controller/processor, a memory, a communication interface, or a combination thereof (e.g., FIG. 7). For instance, the one or more components of the set of components may include or may be included in a controller/processor, a memory, or a combination thereof. In some aspects, the one or more of the components included in the control infrastructure 104 may be separate and distinct from each other. Alternatively, in some aspects, one or more of the components included in the control infrastructure 104 may be combined with one or more of other components included in the control infrastructure 104. In some aspects, the one or more of the components included in the VSP control infrastructure 104 may be local with respect to each other. Alternatively, in some aspects, one or more of the components included in the control infrastructure 104 may be located remotely with respect to one or more of other components included in the control infrastructure 104. Additionally, or alternatively, one or more components of the components included in the control infrastructure 104 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, a set of (one or more) components shown in FIG. 2 may be configured to perform one or more functions described as being performed by another set of components shown in FIG. 2.

Figure 2:
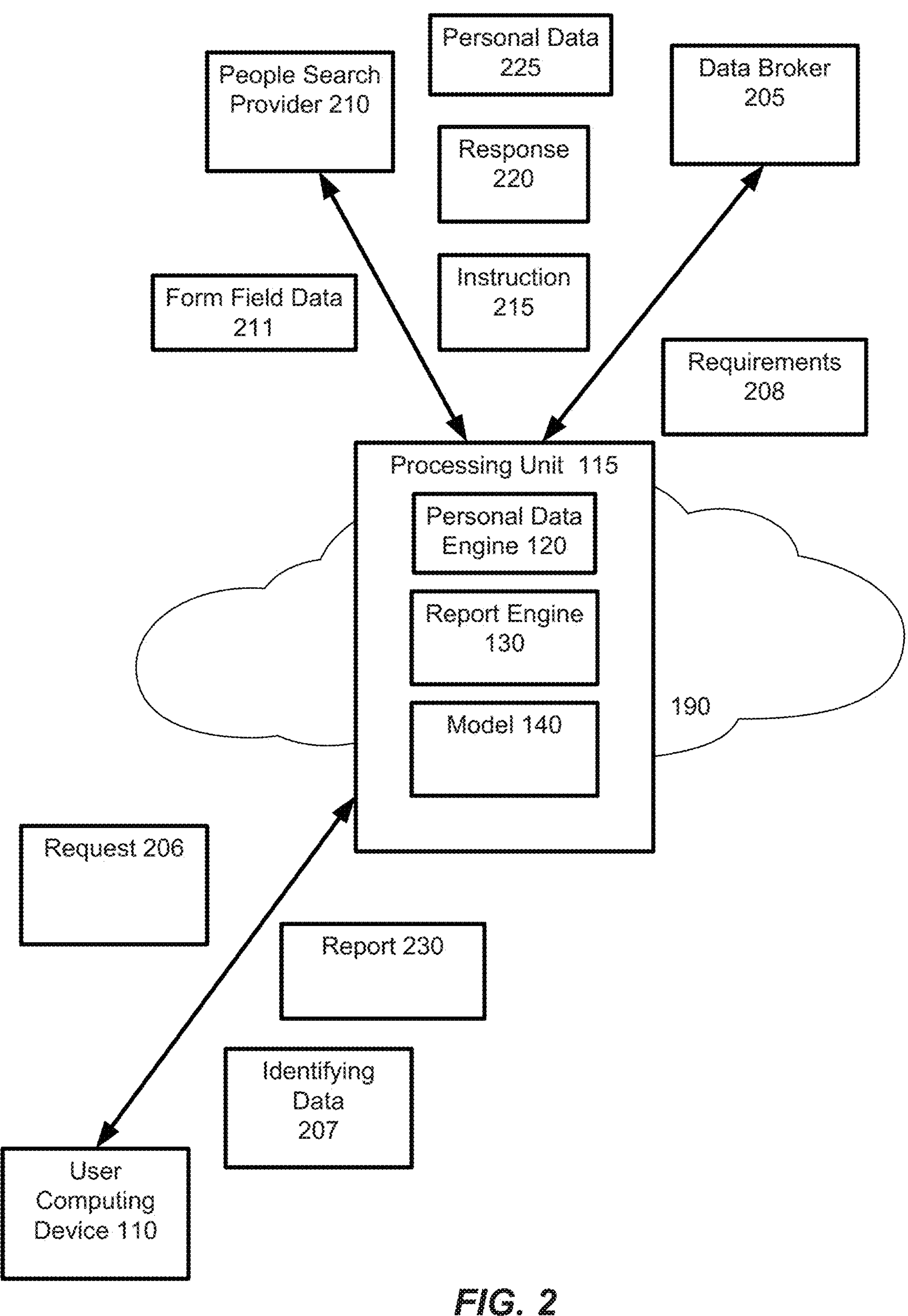
FIG. 2 is an illustration of an example processing unit.

With references to FIG. 2, data brokers 205 maintain, collect, and sell personal data 225 to various third-parties. Typically, data brokers 205 sell personal data to companies who may use it for targeted advertising purposes, lead generation, and statistical analysis, for example. People search providers 210 also collect and sell personal data 225, but typically sell the data directly to individuals. For example, people search providers 210 typically maintain applications, web-based applications, and/or websites through which a user can submit identifying data 207 about an individual such as their name, for example. The user is presented with names of individuals who match, or are partial matches of, the identifying data 207, and the user can purchase the personal data 225 of each named individual through the application, web-based application, and/or website.

To comply with various laws regarding data privacy, people search providers 210 and data brokers 205 allow individuals to request that their personal data 225 be removed. However, contacting each data broker 205 and/or people search provider 210 can be a difficult and time-consuming task. Moreover, many individuals may not be aware of the various people search providers 210 and data brokers 205 that have their personal data 225.

Accordingly, to allow for the removal of personal data 225 from people search providers and data brokers 205, the processing unit 115 includes the personal data engine 120. In one embodiment, a user may use a user computing device 110 to send a request 206 to find and remove personal data 225 from one or more people search providers 210 and/or data brokers 205.

In response to the request 206, the personal data engine 120 may ask the user to provide identifying data 207 that can be used to determine if a people search provider 210 or data broker 205 has their personal data 225 in one or more databases. The identifying data 207 may include, but is not limited to, name, address or address history, telephone number, age, sex, place of birth, citizenship, driver's license number, email address, social media account handles, and date of birth. Other information may be included. As will be described further below, each people search provider 210 or data broker 205 may have its own requirements regarding what combination of identifying data 207 is required to determine if there is stored personal data 225 for a user.

With respect to data brokers 205, after a user submits a request 206 and identifying data 207, the personal data engine 120 may initially determine which data brokers 205 should be contacted about the personal data 225 of the user. In some embodiments, the data brokers 205 may be selected based on the location or citizenship of the user. Some data brokers 205 only operate in certain countries or regions, and therefore the location or citizenship of the user may inform which data brokers 205 should be contacted. In addition, depending on the citizenship of the user different laws may control whether a data broker 205 must remove personal data 225 associated with the user.

In some embodiments, the user may select the data brokers 205 that they would like to request removal of their personal data 225 from. For example, the user may be presented with a list of applicable data brokers 205 along with descriptive information about each broker 205. The descriptive information may include a name of each broker 205 and indications of the type of personal data that is collected by the broker 205.

After determining the data brokers 205, the personal data engine 120 may retrieve requirements 208 for each data broker 205 and may formulate an instruction 215 for the data broker 205 to delete any personal data 225 associated with the user. The requirements 208 for a data broker 205 may describe what identifying data 207 is required by the data broker 205 to identify and remove personal data 225 for a user. For example, some data brokers 205 may require an age, name, and address for each user, other data brokers 205 may require an age, a name, and a phone number. Other combinations of identifying data 207 may be used by a data broker 205. As may be appreciated, when the personal data engine 120 generates the instruction 215 for a data broker 205, the personal data engine 120 may use the requirements 208 to determine a minimum subset of the identifying data 207 provided by the user to use for the instruction 215. By using only the minimum subset of the identifying data 207 for the instruction 215, the processing unit 115 (e.g., personal data engine 120) avoids supplying potentially unknown personal data to the data broker 205 or people search provider 210.

In some embodiments, before sending the instruction 215 to a data broker 205, the personal data engine 120 may verify that the data broker 205 has personal data 225 of the user stored in a database. The personal data engine 120 may verify that the data broker 205 has personal data 225 of the user using the identifying data 207 and the requirements 208. The subset of the identifying data 207 needed for a data broker 205 to verify whether or not it has personal data 225 of the user may be specified by the requirements 208 associated with the data broker 205.

After sending instructions to each data broker 205, the personal data engine 120 may begin to receive responses 220 from each of the data brokers 205. A response 220 from a data broker 205 may indicate whether the requested personal data 225 was deleted or removed, or whether the requested personal data 225 was not removed. Where the personal data 225 was deleted or removed, in some embodiments the response 220 may identify some or all of the personal data 225 that was deleted or removed.

As may be appreciated, due to the larger number of data brokers 205, reviewing the responses 220 received from the data brokers 205 may be a time-consuming task. Accordingly, rather than review each response 220 manually, the personal data engine 120 may use a model 140 to review each of the responses 220. The model 140 may receive a response 220 and may output a probability that the response 220 is positive (i.e., indicates that the personal data 225 was deleted or removed) and/or a probability that the response is negative (i.e., indicates that the personal data 225 was not deleted or removed). Depending on the embodiment, the model 140 may be a machine learning model that is trained using previously received responses 220 that were labeled by one or more human reviewers.

In some embodiments, the model 140 may be periodically retrained or updated based on an audit of the responses 220. For example, the personal data engine 120 may sample some percentage of the responses 220 that are received. The sampled responses 220 may be classified (labeled) (i.e., positive or negative) by one or more human reviewers and compared with the output of the model 140 for the same responses 220. Responses 220 where the model 140 and the reviewers do not agree may be used to retrain or adjust the model 140.

The report engine 130 may generate a report 230 allowing the user to view the status of their request 206 to remove personal data 225 from each of the data brokers 205. In some embodiments, the report 230 may indicate each data broker 205 that was provided an instruction 215 to remove the personal data 225, whether a response 220 was received in response to the instruction 215, and the outcome of the response 220 if received. The report engine 130 may periodically send the report 230 to the user, or the user may request the report 230 from the report engine 130.

Figure 5:
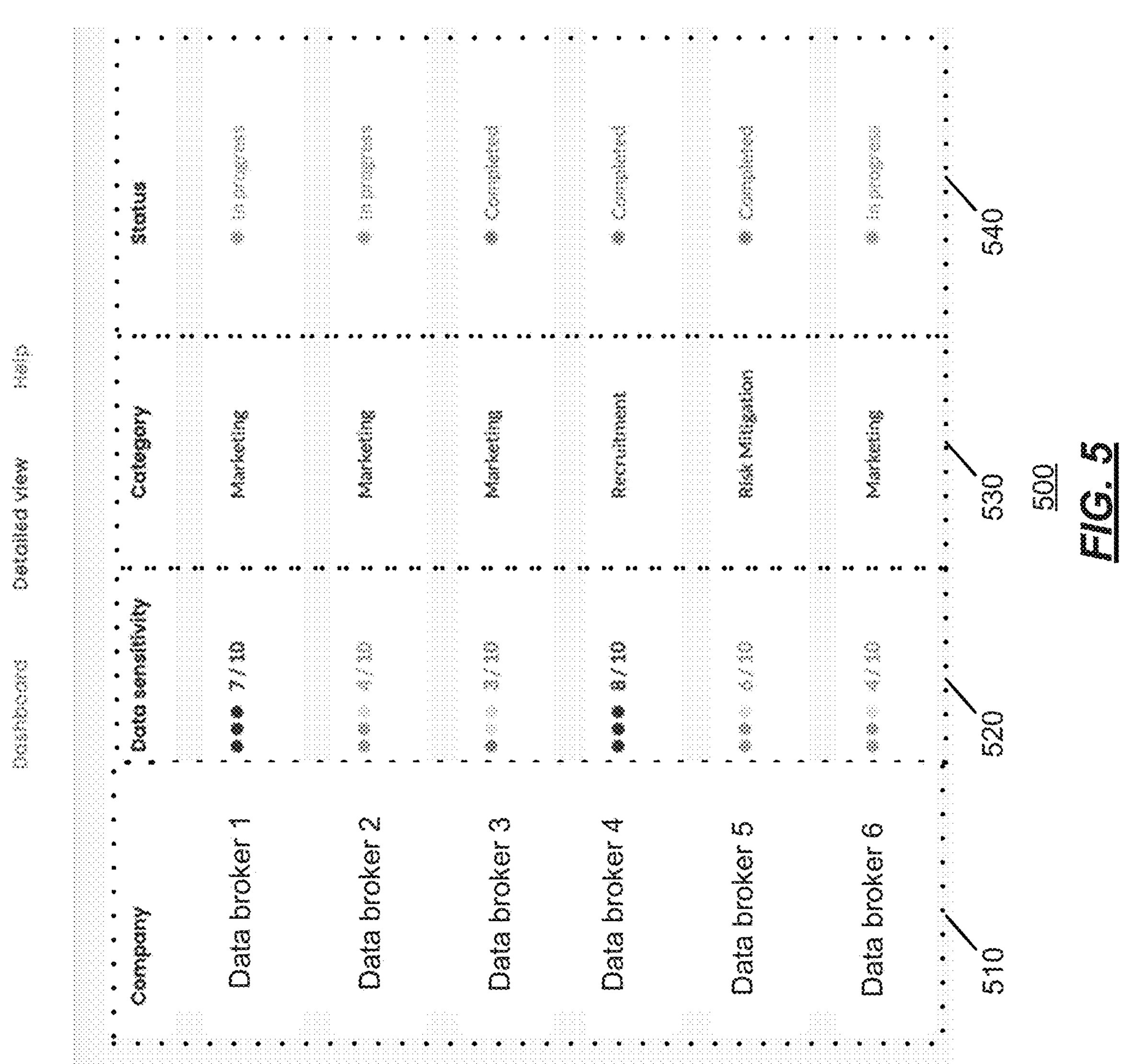
FIG. 5 is an illustration of an example user interface for tracking the removal of personal data from one or more data broker databases.

Continuing to FIG. 5 is an illustration of an example user interface 500 showing an example report 230. As shown, the report 230 include several areas displaying data about the status of the request 206 to remove personal data 225. An area 510 showing the names of each data broker 205 that was instructed to delete the personal data 225 of the user. An area 520 showing the sensitivity of the personal data 225 maintained by each data broker 205 in the area 510. An area 530 showing the category of the personal data 225 collected by each data broker 205 in the area 410. And an area 540 showing the status of the request to remove personal data 225 for each data broker 205 in the area 510.

Figure 6:
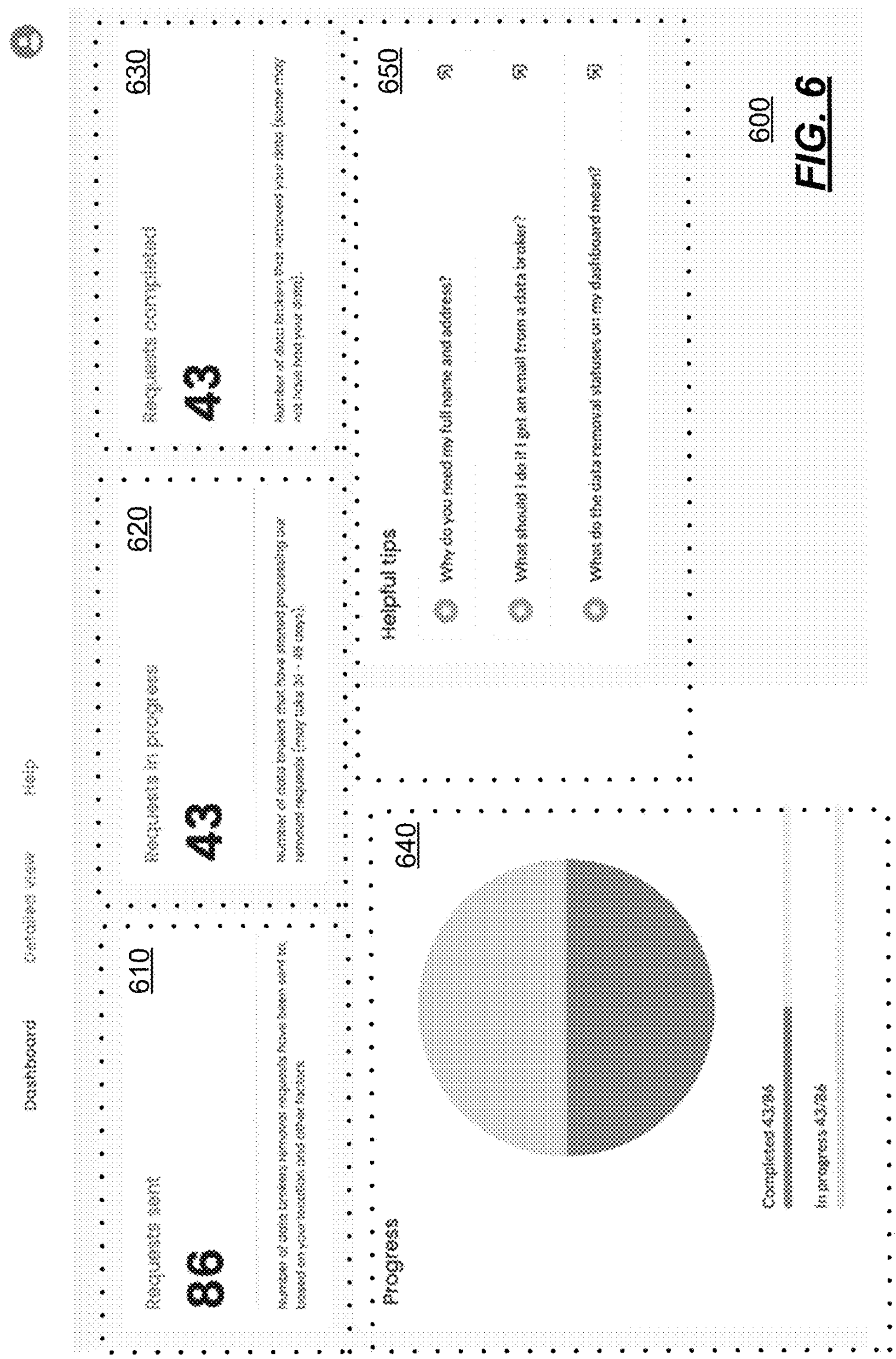
FIG. 6 is an illustration of another example user interface for tracking the removal of personal data from one or more data broker databases.

Continuing to FIG. 6 is an illustration of an example user interface 600 showing another example report 230. The example report 230 of FIG. 6 is less granular than the report 230 of FIG. 5 and more of an overview than the report 230 of FIG. 5. As shown, the report 230 of FIG. 6 includes several areas. An area 610 showing the total number of requests to remove personal data 225 that were sent to data brokers 205. An area 620 showing the number of requests to remove personal data 225 that are pending. An area 630 showing the number of requests to remove personal data 225 that have been completed. An area 640 displaying a pie chart representing the data from the areas 610, 620, and 630. And an area 550 answering questions that the user may have about the personal data 225 removal process.

Returning to FIG. 2, in some embodiments, after a data broker 205 has received a response 220 indicating that the data broker 205 has removed the personal data 225 of a user, the personal data engine 120 may determine if the data broker 205 maintains a suppression list. A suppression list is a list of users whose personal data 225 should not be stored by the data broker 205. The suppression list prevents the data broker 205 from re-ingesting personal data 225 for the users identified on the list. Otherwise, new personal data 225 may be collected for a user in the normal operation of the data broker 205.

If the data broker 205 maintains a suppression list (or other equivalent means to prevent personal data 225 re-ingestion) then the personal data engine 120 may take no further action for the user. Otherwise, the personal data engine 120 may schedule a date in the future to repeat the personal data 225 removal process for the data broker 205. The future date may be a regular occurring date (e.g., every six months) and may be based on observations or other knowledge about how often the data broker 205 collects and updates its personal data 225 for users.

For example, the personal data engine 120 may determine the frequency to re-request the personal data 225 removal process for a data broker 205 by initially re-requesting the removal of personal data 255 from the broker 205 at a first frequency such as every month. If the personal data engine 120 determines that the data broker 205 only re-ingested the personal data 225 after the third month, the personal data engine 120 may change the re-request frequency to every three months.

With respect to people search providers 210, after a user submits a request 206 and identifying data 207, the personal data engine 120 may initially determine which people search providers 210 should be contacted about the personal data 225 of the user. Like the data brokers 205, the people search providers 210 may be selected by the personal data engine 120 based on the location or citizenship of the user or may be selected directly by the user.

Unlike the data brokers 205, each people search provider 210 may maintain an application, an web-based application, and/or a website, through which users can submit queries for the personal data 225 of individuals. The application, web-based application, and/or website used by each people search provider 210 may differ from each other. For example, one application, web-based application, and/or website, may require users to provide a name and a state for a desired individual, and another application, web-based application, and/or website, may require just a name. In addition, the fields through which the user provides their query may be at a different location on the application, web-based application, and/or website, and may use a different button or user-interface element to submit the query. Furthermore, each people search provider 210 may use a different form, with different identifying data 203, to request removal of personal data 225 for a user.

In one example, to facilitate the removal of personal data 225 from people search providers 210, the personal data engine 120 may collect and maintain form field data 211 from each website associated with a people search provider 210. The form field data 211 for a website of a people search provider 210 may indicate the location of each field used to query the website along with the type of data expected for each field (e.g., first name, last name, city, state, and age). In addition, the form field data 211 for a website associated with a people search provider 210 may include a URL of a form used to request removal of personal data 225 including the locations and types of any fields.

To create the form field data 211, in some embodiments, the personal data engine 120 may periodically scrape or retrieve the contents of the website associated with each people search provider 210. A human or computer reviewer may then identify each relevant field as well as its location and type. Any method for identifying fields on a website may be used.

The personal data engine 120 may query each of the selected people search providers using the identifying data 207 and the form field data 211. In some embodiments, the personal data engine 120 may use a web browser to enter data from the identifying data 207 into one or more fields of the websites associated with each of the selected people search providers 210. Other methods may be used.

In another example, to facilitate the removal of personal data 225 from people search providers 210, the personal data engine 120 may collect and maintain form field data 211 from each application associated with a people search provider 210. The form field data 211 for an application of a people search provider 210 may indicate the location of each field used to query the application along with the type of data expected for each field (e.g., first name, last name, city, state, and age). In addition, the form field data 211 for an application associated with a people search provider 210 may include a one or more Application Programming Interfaces (API) used to request removal of personal data 225 including the locations and types of any fields.

The personal data engine 120 may query each of the selected people search providers using the identifying data 207 and the form field data 211. In some embodiments, the personal data engine 120 may use an application to enter data from the identifying data 207 into one or more fields of the websites associated with each of the selected people search providers 210. Other methods may be used.

In response to the queries, the personal data engine 120 may receive identifiers of individuals that match, or are partial matches of, the provided identifying data 207. Generally, each people search provider 210 may respond to the query by displaying matching individuals on the associated website. Each matching individual may represent the same or different individual than the user that submitted the request 206. For example, there may be several individuals with a common name, or a single individual may have multiple entries with different addresses or with different name variations.

The personal data engine 120 may use the identifying data 207 to determine the individuals that likely are the same as the user that submitted the request 206. In some embodiments, the personal data engine 120 may determine the individuals using the identifying data 207 including a portion of the identifying data 207 not used to query the people search providers 210 such as age, phone number, email address, etc. For example, the personal data engine 120 may perform the query using the name of the user and may determine which individuals returned are the same as the user using the address and age of the user.

After determining the individuals that likely correspond to the user that submitted the request 206, the people search provider 210 may generate and submit an instruction 215 to each people search provider 210 to remove the personal data 225 associated with the individual. The people search provider 210 may use the form field data 211 associated with each people search provider 210 and the identifying data 207 to generate the instructions 215.

After sending instructions 215 to each people search provider 210, the personal data engine 120 may begin to receive responses 220. A response 220 from a people search provider 210 may indicate whether the requested personal data 225 was deleted or removed, or whether the requested personal data 225 was not removed. Where the personal data 225 was deleted, in some embodiments the response 220 may identify some or all of the personal data 225 that was deleted.

Similar to the data broker 205, rather than review each response 220 manually, the personal data engine 120 may use a model 140 to review each of the responses 220. The model 140 may be the same or a different model than the model 140 used to review responses 220 from data brokers 205.

The report engine 130 may generate a report 230 allowing the user to view the status of their request 206 to remove personal data 225 from each of the people search providers 210. The report 230 may be the same or a different report 230 than the report 230 described above with respect to the data brokers 205.

Figure 3:
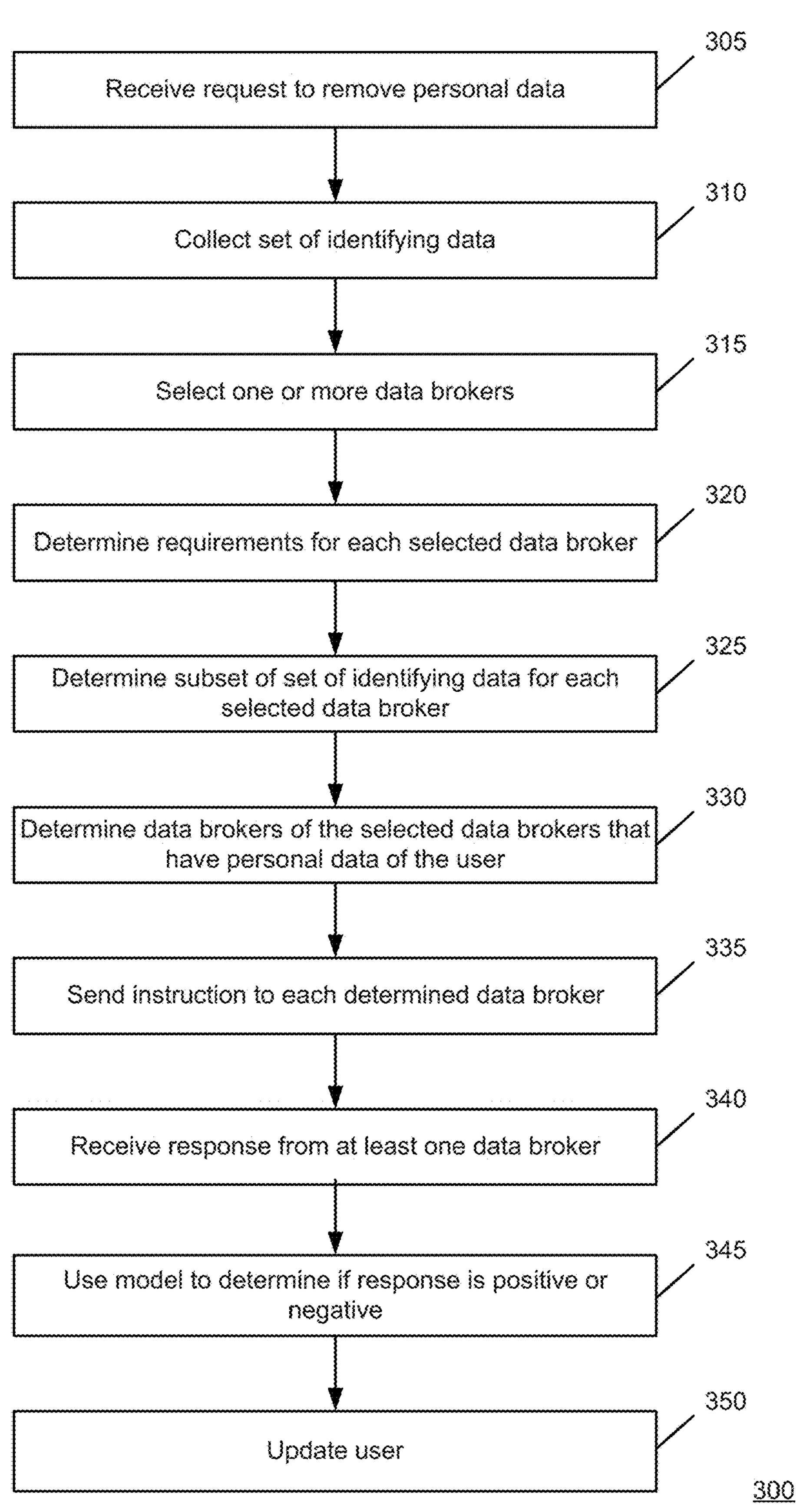
FIG. 3 is an illustration of an example method for removing personal data from one or more data broker databases.

FIG. 3 is an illustration of an example method 300 for removing personal data from one or more data brokers 305 databases. The method 300 may be implemented by the processing unit 115.

At 305, a request to remove personal data 225 is received. The request 206 may be received by the personal data engine 120 from a user associated with a user computing device 110 through the network 190. The request 206 may be to remove personal data 225 from one or more data brokers 205.

At 310, a set of identifying data 207 is collected. The set of identifying data 207 may be collected by the personal data engine 120 from the user. In some embodiments, the personal data engine 120 may prompt the user to provide the set of identifying data 207 through the user computing device 110. The set of identifying data 207 may include data such as a name, address, telephone number, email, address, birthdate, sex, gender, and marital status, for example.

At 315, one or more data brokers 205 are selected. The data brokers 205 may be selected by the personal data engine 120. Depending on the embodiment, the one or more data brokers 205 may be selected based on a location or citizenship of the user, or selected by the user from a list of data brokers 205 provided by the personal data engine 120.

At 320, requirements 208 for each selected data broker 205 are determined. The requirements 208 for a data broker 205 may be determined by the personal data engine 120. The requirements 208 for a data broker 205 may identify the identifying data 207 that is necessary to either confirm the presence of personal data 225 for the user or to remove the personal data 225 of the user.

At 325, a subset of the identifying data 207 is determined for each of the selected data brokers 205. The personal data engine 120 may determine the subset of identifying data 207 for a data broker 205 using the requirements 208 associated with the data broker 205. In some embodiments, a subset is not determined and each data broker 205 may receive the same identifying data 207.

At 330, data brokers 205 of the selected data brokers 205 that have personal data 225 of the user are determined. The data brokers 205 that have personal data 225 of the user may be determined by the personal data engine 120 using the subset of identifying data 207. In some implementations the system filters out the data brokers that are not likely to have the personal data of the person (e.g., the broker deals only include single US state residents data). Therefore, in this implementation a data broker 205 may be determined using the subset of metadata collected on the data brokers 205.

At 335, an instruction 215 is sent to each data broker 205 determined to have the personal data 225. The instruction 215 may be generated and sent by the personal data engine 120.

At 340, a response 220 is received from at least one data broker 205. The response 220 may be received by the personal data engine 120.

At 245, whether the response is positive or negative is determined using a model 140. The personal data engine 120 may use a machine learning model 140 to determine whether the response 220 is positive or negative. A response 220 may be positive when it indicates that the personal data 225 of the user has been removed, and may be negative when it indicates that the personal data 225 has not been removed.

In some embodiments the removal request will generally conclude as "completed" (broker indicated that they've removed the data), "rejected" (broker refused to act on the request) or "no_data_found" (broker indicated that they were unable to find any personal data supplied in the request in their systems). The machine learning model 140 attempts to determine the state of the specific request based on data broker's email response contents—in addition to the previously mentioned "conclusive" states, it might also respond with "pending_intervention" in case it thinks that the broker response is not conclusive (e.g., asking for clarification, auto-responder, etc.) and needs to be reviewed by a human. (For the sake of completeness, the model also returns a confidence score-a floating point number between 0 and 1, which indicates how confident the model is that it's guess was correct.).

At 350, the user is updated. The user may be updated with respect to each response 220 received by the personal data engine 120. In some embodiments, the report engine 130 may update the user by generating and providing the user a report 230.

Figure 4:
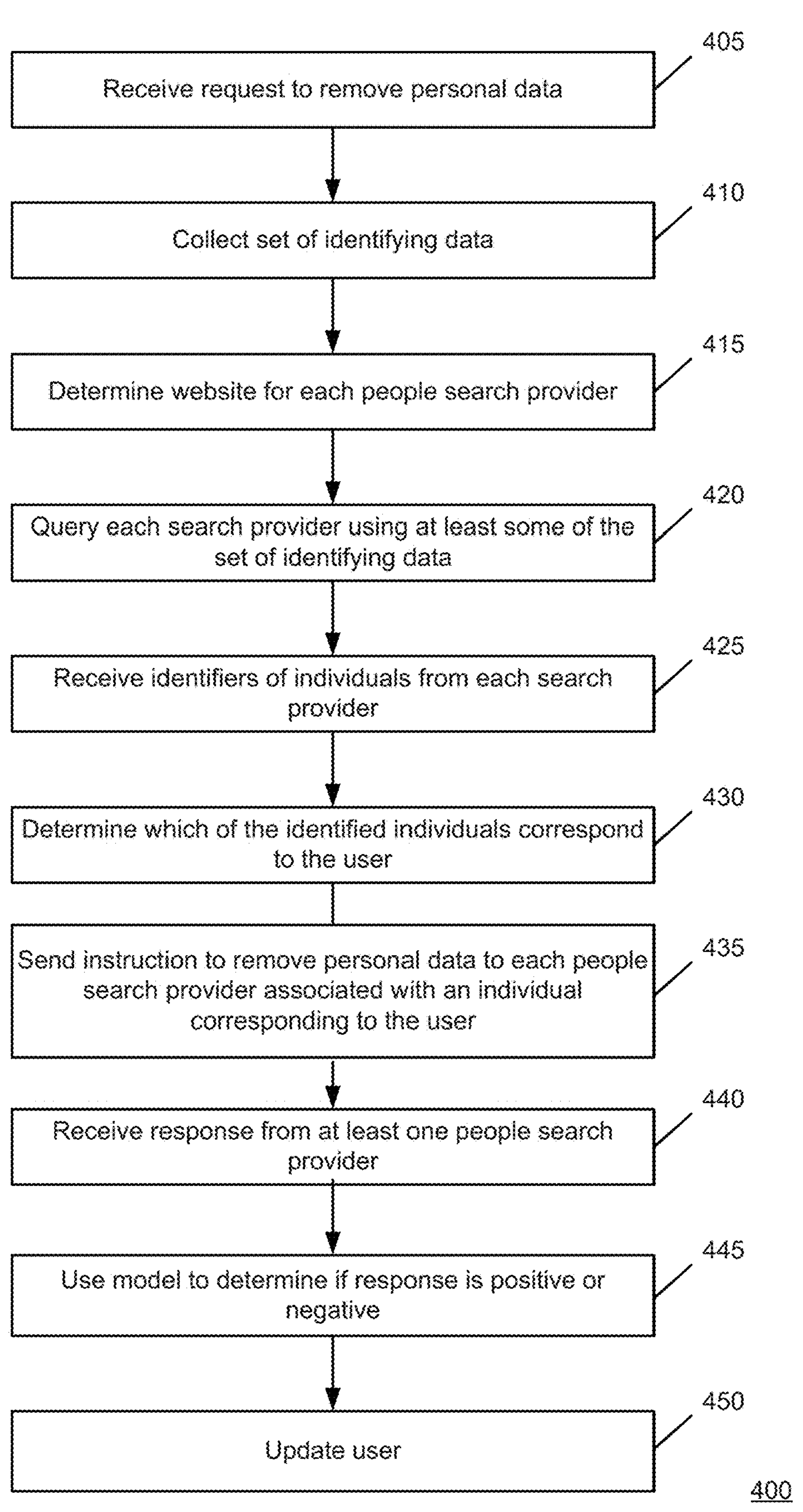
FIG. 4 is an illustration of an example method for removing personal data from one or more people search provider databases.

FIG. 4 is an illustration of an example method 400 for removing personal data from one or more people search provider 210 databases. The method 400 may be implemented by the processing unit 115.

At 405, a request to remove personal data 225 is received. The request 206 may be received by the personal data engine 120 from a user associated with a user computing device 110 through the network 190. The request 206 may be to remove personal data 225 from one or more people search providers 210.

At 410, a set of identifying data 207 is collected. The set of identifying data 207 may be collected by the personal data engine 120 from the user. In some embodiments, the personal data engine 120 may prompt the user to provide the set of identifying data 207 through the user computing device 110. The set of identifying data 207 may include data such as a name, address, telephone number, email, address, birthdate, sex, gender, and marital status, for example.

At 415, a website for each people search provider 210 is determined. The website for a people search provider may be determined by the personal data engine 120. For example, there may be a mapping of websites to people search providers 210.

At 420, each of the people search providers 210 are queried using at least some of the identifying data. A people search provider 210 may be queried by the personal data engine 120 using at least some of the identifying data 207 and the form field requirements 208 for the people search provider 210. The personal data engine 120 may use the form field data 211 associated with the website to determine the location of fields on the website and a type of data required for each field. The personal data engine 120 may then use the identifying data 207 to complete each field and to submit the query.

At 425, identifiers of individuals are received from each people search provider 210. The identifiers of individuals may be revived by the personal data engine 120. Each identified individual may be displayed to the personal data engine 120 on the website associated with each people search provider 210.

At 430, which of the identified individuals correspond to the user are determined. The determination may be made by the personal data engine 120 using the identifying data 207. For example, the personal data engine 120 may use identifying data not used to query the people search provider 210 such as age and state of residence.

At 435, instructions 215 are sent to each people search provider 210 associated with a determined individual to remove personal data 225 associated with the individual. The instruction sent to each people search provider 210 may be sent to each people search provider 210 through a form identified in the form field data 211 associated with each people search provider 210.

At 440, a response 220 is received from at least one people search provider 210. The response 220 may be received by the personal data engine 120.

At 345, whether the response is positive or negative is determined using a model 140. The personal data engine 120 may use a machine learning model 140 to determine whether the response 220 is positive or negative. In some embodiments the people search provider 210 may respond indicating success or failure immediately. No involvement of the ML model 140 then is required.

At 450, the user is updated. The user may be updated with respect to each response 220 received by the personal data engine 120. In some embodiments, the report engine 130 may update the user by generating and providing the user a report 230.

FIG. 7 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 606.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 608 and non-removable storage 710.

Computing device 700 typically includes a variety of computer readable media. Computer readable media can be any available media that can be accessed by the device 700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communication connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for removing personal data from one or more data brokers comprising:

receiving, by a computing device, a request to remove personal data for a user;

collecting, by the computing device, a set of identifying data from the user in response to the request to remove the personal data;

selecting, by the computing device, one or more data brokers from a plurality of data brokers;

identifying, by the computing device, a web-based submission form specific to each of the selected one or more data brokers;

for each data broker of the selected one or more data brokers, determining, by the computing device, a minimum subset of the set of identifying data required by the identified web-based submission form;

sending, by the computing device, an instruction to remove the personal data to each of the selected one or more data brokers, wherein each instruction sent to a data broker includes the minimum subset of the set of identifying data determined for the data broker;

receiving, by the computing device, a response to the instruction from at least one data broker;

automatically classifying, by the computing device using a machine learning model and the response and without input from a human, whether the response indicates that the personal data was removed by the at least one data broker, wherein the machine learning model is trained using a set of training data, the set of training data comprising a plurality of responses previously received from some or all of the plurality of data brokers, wherein each of the plurality of responses is labeled as either indicating that personal data was removed or that personal data was not removed; and notifying, by the computing device and in response to determining that the response indicates that the personal data was removed, the user that the response indicates that the personal data was removed by the at least one data broker.

2. The method of claim 1, further comprising:

automatically determining that the response indicates that the personal data was not removed by the at least one data broker using the machine learning model; and notifying the user that that the response indicates that the personal data was not removed by the at least one data broker.

3. The method of claim 1, further comprising:

determining that a threshold amount of time has passed since the instruction was sent to the at least one data broker; and resending the instruction to the at least one data broker in response to determining that the threshold amount of time has passed.

4. The method of claim 3, further comprising:

determining whether the at least one data broker does not maintain a suppression list; and resending the instruction only if the at least one data broker does not maintain the suppression list.

5. The method of claim 1, wherein selecting one or more data brokers from the plurality of data brokers by the computing device comprises:

determining a location associated with the user; and selecting the one or more data brokers based on the determined location.

6. The method of claim 1, wherein selecting one or more data brokers from the plurality of data brokers by the computing device comprises:

determining data brokers of the plurality of data brokers that have the personal data of the user using some or all of the set of identifying data and requirements associated with each data broker of the plurality of data brokers; and selecting the one or more data brokers based on the data brokers of the plurality of data brokers determined to have the personal data.

7. The method of claim 1, wherein the set of identifying data comprises one of a name, age, address, address, email address, or phone number.

8. A system for removing personal data from one or more data brokers comprising:

at least one computing device comprising one or more hardware processors; and a non-transitory computer-readable medium with computer-executable instructions that when executed by the at least one computing device cause the at least one computing device to:

receive a request to remove personal data for a user;

collect a set of identifying data from the user in response to the request to remove the personal data;

select one or more data brokers from a plurality of data brokers;

identify a web-based submission form specific to each of the selected one or more data brokers;

for each data broker of the selected one or more data brokers, determine a minimum subset of the set of identifying data required by the identified web-based submission form;

send an instruction to remove the personal data to each of the selected one or more data brokers, wherein each instruction sent to a data broker includes the minimum subset of the set of identifying data determined for the data broker;

receive a response to the instruction from at least one data broker;

automatically classify, using a machine learning model and the response and without input from a human, whether the response indicates that the personal data was removed by the at least one data broker, wherein the machine learning model is trained using a set of training data, the set of training data comprising a plurality of responses previously received from some or all of the plurality of data brokers, wherein each of the plurality of responses is labeled as either indicating that personal data was removed or that personal data was not removed; and notify, in response to determining that the response indicated that the personal data was removed, the user that the response indicates that the personal data was removed by the at least one data broker.

9. The system of claim 8, further comprising computer-executable instructions that when executed by the at least one computing device cause the at least one computing device to:

automatically determine that the response indicates that the personal data was not removed by the at least one data broker using the machine learning model; and notify the user that that the response indicates that the personal data was not removed by the at least one data broker.

10. The system of claim 8, further comprising computer-executable instructions that when executed by the at least one computing device cause the at least one computing device to:

determine that a threshold amount of time has passed since the instruction was sent to the at least one data broker; and resend the instruction to the at least one data broker in response to determining that the threshold amount of time has passed.

11. The system of claim 10, further comprising computer-executable instructions that when executed by the at least one computing device cause the at least one computing device to:

determine whether the at least one data broker does not maintain a suppression list; and resend the instruction only if the at least one data broker does not maintain the suppression list.

12. A non-transitory computer-readable medium with computer-executable instructions that when executed by at least one computing device cause the at least one computing device to:

receive a request to remove personal data for a user;

collect a set of identifying data from the user in response to the request to remove the personal data;

select one or more data brokers from a plurality of data brokers;

identify a web-based submission form specific to each of the selected one or more data brokers;

for each data broker of the selected one or more data brokers, determine a minimum subset of the set of identifying data required by the identified API or web-based submission form;

send an instruction to remove the personal data to each of the selected one or more data brokers, wherein each instruction sent to a data broker includes the minimum subset of the set of identifying data determined for the data broker;

receive a response to the instruction from at least one data broker;

automatically classify, using a machine learning model and the response and without input from a human, that the response indicates that the personal data was removed by the at least one data broker, wherein the machine learning model is trained using a set of training data, the set of training data comprising a plurality of responses previously received from some or all of the plurality of data brokers, wherein each of the plurality of responses is labeled as either indicating that personal data was removed or that personal data was not removed; and notify, in response to determining that the response indicated that the personal data was removed, the user that the response indicates that the personal data was removed by the at least one data broker.

13. The computer-readable medium of claim 12, further comprising computer-executable instructions that when executed by the at least one computing device cause the at least one computing device to:

automatically determine that the response indicates that the personal data was not removed by the at least one data broker using the machine learning model; and notify the user that that the response indicates that the personal data was not removed by the at least one data broker.

14. The computer-readable medium of claim 12, further comprising computer-executable instructions that when executed by the at least one computing device cause the at least one computing device to:

determine that a threshold amount of time has passed since the instruction was sent to the at least one data broker; and resend the instruction to the at least one data broker in response to determining that the threshold amount of time has passed.

* * * * *